July 2, 1963  H. N. BLISS ETAL  3,096,018
PREDETERMINING COUNTER MECHANISM
Filed June 24, 1959  3 Sheets-Sheet 1

INVENTORS
HARVEY N. BLISS
GEORGE W. WHITE

BY
*Lindsey and Prutzman*
ATTORNEYS

July 2, 1963 H. N. BLISS ETAL 3,096,018
PREDETERMINING COUNTER MECHANISM
Filed June 24, 1959 3 Sheets-Sheet 2
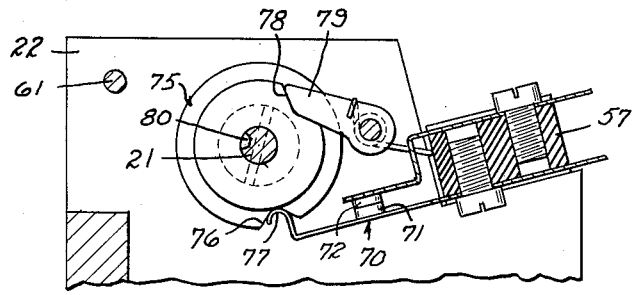
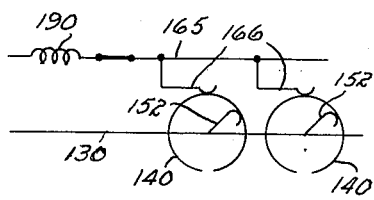
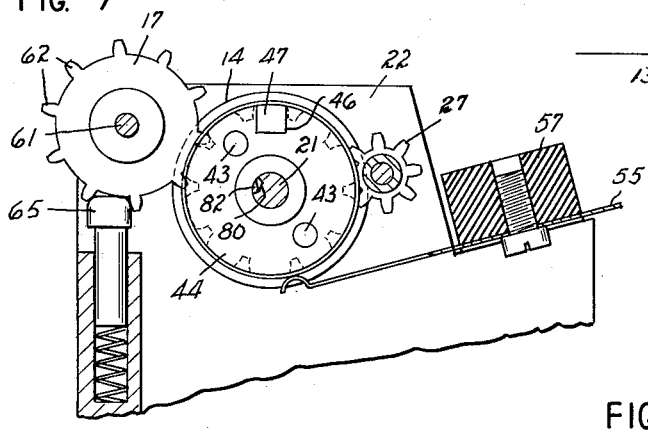
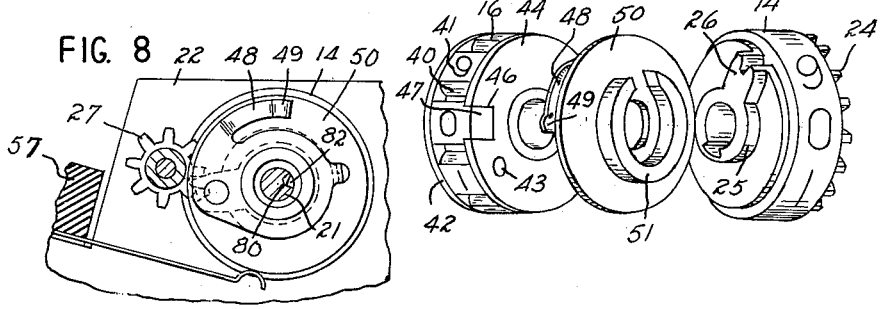
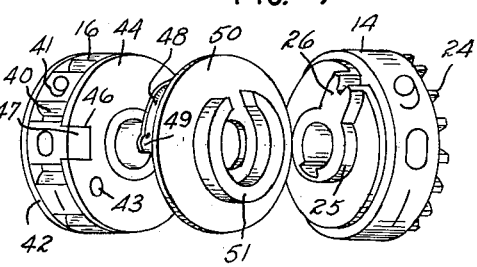
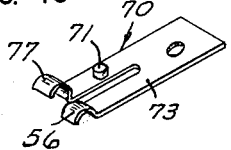
INVENTORS
HARVEY N. BLISS
GEORGE W. WHITE
BY Lindsey and Prutzman
ATTORNEYS July 2, 1963
H. N. BLISS ETAL
3,096,018
PREDETERMINING COUNTER MECHANISM
Filed June 24, 1959
3 Sheets-Sheet 3
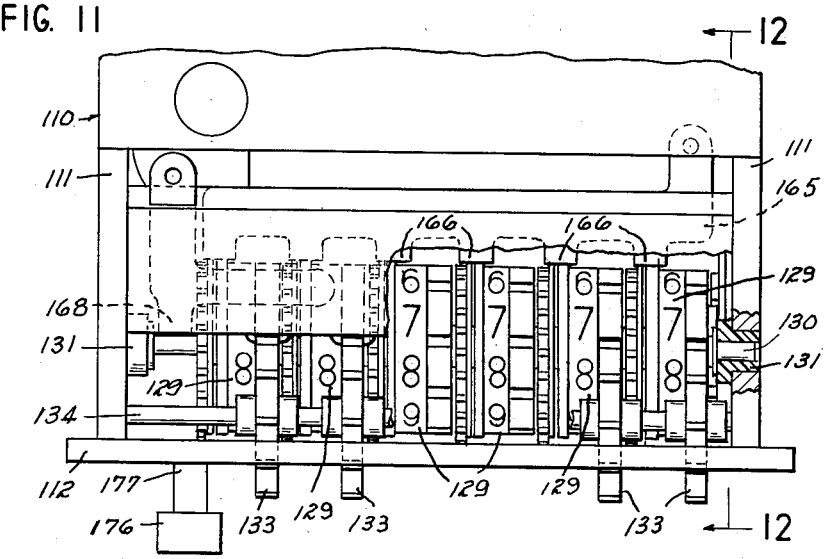
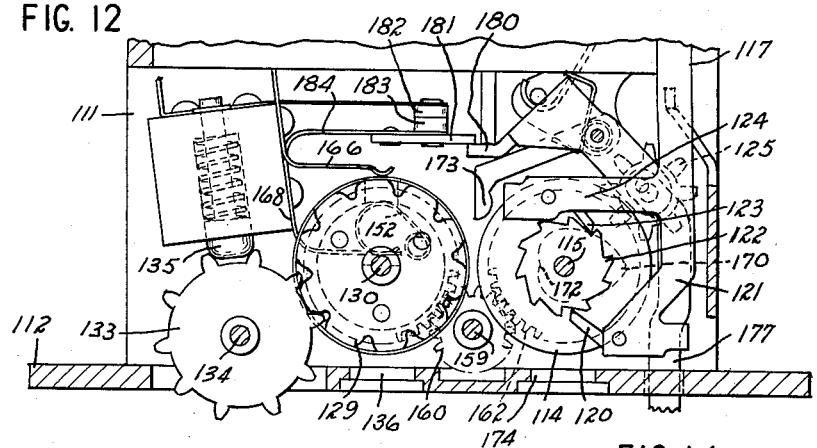
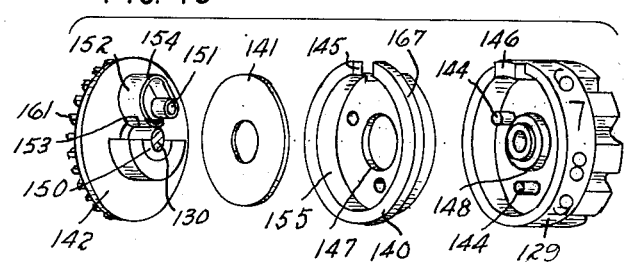
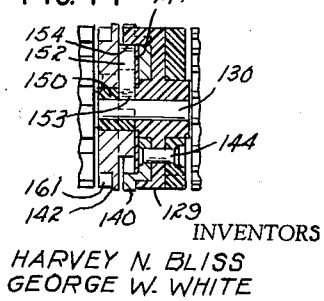
INVENTORS
HARVEY N. BLISS
GEORGE W. WHITE
BY *Lindsey and Prutzman*
ATTORNEYS United States Patent Office 3,096,018
Patented July 2, 1963

3,096,018
PREDETERMINING COUNTER MECHANISM
Harvey N. Bliss, Windsor, and George W. White, West Hartford, Conn., assignors to Veeder-Root, Incorporated, Hartford, Conn., a corporation of Connecticut
Filed June 24, 1959, Ser. No. 822,517
7 Claims. (Cl. 235—132)

This invention relates to an improved predetermining counter for controlling an electrical circuit upon attaining a predetermined count.

It is a general object of this invention to provide an improved predetermining counter wherein the predetermined count can be quickly set by turning the setting member in either direction of rotation, even while the counter is running, wherein the predetermined count indication remains at the set position throughout count indication remains at the set position throughout the counting operation, and which is reliable, effective and easily manufactured.

It is an additional object of this invention to provide a predetermining counter which will open an electrical circuit when the counting wheels reach the count set on the preset wheels.

It is a further object of this invention to provide an improved counter wherein an electrical circuit is broken upon attaining the predetermined number, which circuit remains open until resetting movement of the counting wheels is completed.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 6 is a partial cross section view taken along the lines 6—6 of FIG. 3;

FIG. 7 is a partial cross section view taken along the lines 7—7 of FIG. 3;

FIG. 8 is a partial cross section view taken along the lines 8—8 of FIG. 3;

FIG. 9 is a partial perspective view of the counting and preset wheels of FIG. 1;

FIG. 10 is a perspective view of one of the switch contacts shown in FIG. 6;

FIG. 11 is a partial top plan view of a second embodiment of my invention with a portion of the housing cut away;

FIG. 12 is a partial cross section view taken along the lines 12—12 of FIG. 11;

FIG. 13 is an exploded view of the preset wheel and rotatable contacts;

FIG. 14 is a partial cross section of the elements of FIG. 13 assembled in operating position;

FIG. 16 is a schematic circuit diagram of a circuit usable with the counter of FIG. 11.

Figure 1:
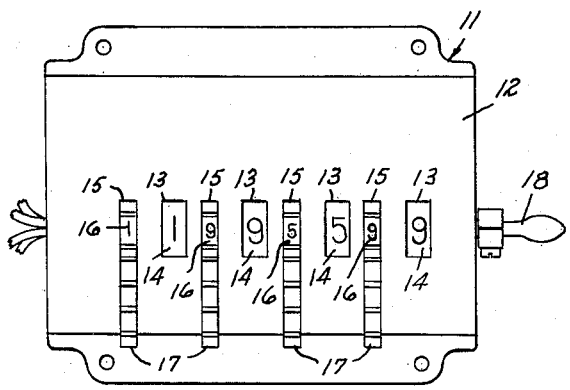
FIG. 1 is a top plan view of a preferred embodiment of my improved counter.
Figure 2:
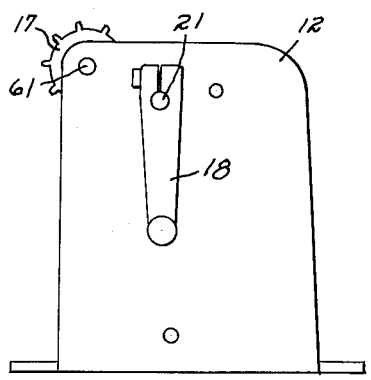
FIG. 2 is a side elevation view of the counter shown in FIG. 1.
Figure 3:
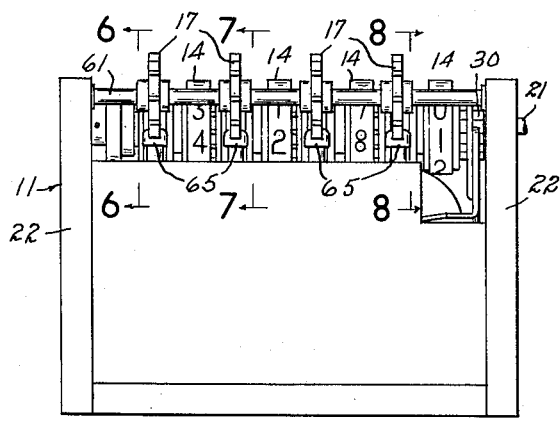
FIG. 3 is a front elevation view of the counter of FIG. 1 with a portion of the housing cut away to reveal the internal structure.
Figure 4:
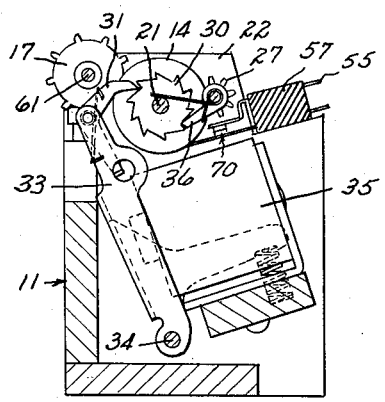
FIG. 4 is a partial cross section view showing a drive mechanism for advancing the counter.
Figure 5:
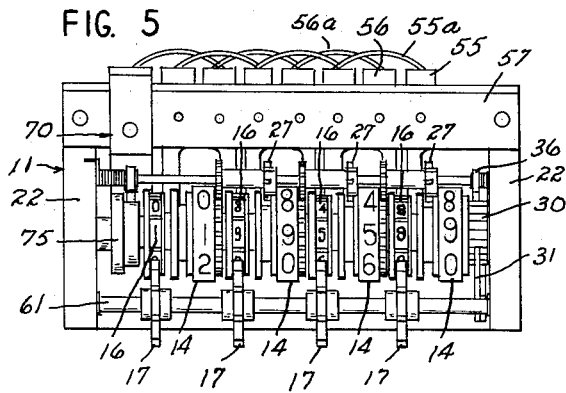
FIG. 5 is a partial top plan view of the counter shown in FIG. 1 with the housing removed.

Referring first to the embodiment of my predetermining counter shown in FIGS. 1–10, it is seen that the counter generally comprises a frame 11 enclosed by a housing 12 having a series of windows 13 through which the counting wheels 14 may be viewed, a series of windows designated 15, through which the preset wheels 16 may be viewed, a setting wheel 17 for each preset wheel, and a lever 18 for resetting the counting wheels.

Turning first to the counting wheels and their actuation, it is seen that each counting wheel 14 is provided with indicia increasing from 0–9 about its outer periphery and is supported for rotation on shaft 21, which shaft is journalled in side supports 22 of frame 11. As most clearly seen in FIG. 9, each counting wheel 14 is provided with a driven gear 24 and a two-toothed driving gear 26, which cooperate with transfer pinions 27 to establish an operatively connected conventional counting wheel train whereby the counting wheels 14 are caused to advance one number for each complete revolution of the next lowest order counting wheel in a conventional manner. The counting wheel, driven gear, and driving gear are molded in the preferred embodiment from an insulating material such as nylon. The lowest order counting wheel has affixed thereto the ratchet wheel 30, rotatably mounted on shaft 21 and operatively engaged by a drive pawl 31 which in turn is mounted on the lever 33 so that oscillation of lever 33 about the pivot point 34, by pulsed energization of solenoid 35, causes the lowest order drive wheel to be advanced in a step by step counting manner. The spring biased pawl 36 prevents reverse rotation of the ratchet wheel.

The preset wheels which cooperate with the counting wheels to effect the predetermining action of the counter are molded from an insulating material such as nylon and are rotatably mounted on shaft 21 coaxial with the counting wheels and in alternate arrangement therewith. As most clearly seen in FIG. 5, transfer pinions 27, which operatively interconnect adjacent counting wheels, have an elongated shank which permits spacing of next adjacent counting wheels so as to receive a predetermining wheel and its associated structure therebetween. Again referring particularly to FIG. 9, it is seen that the preset wheel 16 is provided with spaced axial grooves 40 about its periphery to define projections 41 similar to gear teeth. There are ten such projections in the preferred embodiment and indicia from 0–9 are distributed thereon in conformance with indicia on the counting wheels. On one side of each preset wheel is mounted a brass or other conductive disc 42, which disc is insulated from the shaft 21 and has a diameter slightly greater than the diameter of the periphery of the preset wheel. On the other side of each preset wheel is mounted a disc 44, made of an electrically conducting material such as brass and having a diameter substantially equal to the diameter of the periphery of the preset wheel. It is to be noted that the disc 44 is provided with a notch 46 and that the notched area is filled with an abutment 47 of insulating material in registry with the preset wheel tooth carrying the "0" designation. In addition, disc 44 and disc 42 are permanently connected together electrically and fastened to preset wheel 16 by a pair of rivets 43.

Cooperating with disc 44 is contact arm 48 which is carried by and electrically connected to disc 50. In the preferred embodiment, contact arm 48 has contact 49 formed integrally therewith. Disc 50, in turn, is drivingly supported by adjacent counting wheel 14 through engagement of the collar 51 with hub 25 of two-toothed gear 26. Contact 49 is spaced from the axis of rotation of disc 50 so as to engage disc 44 along a circumference passing through notch 46 and insulating abutment 47. Contact 49 is positioned opposite the zero designation on counting wheel 14. However, it is noted that contact 49 need only be positioned opposite the same designation as the abutment 47. For example, if it is found desirable to position abutment 47 opposite the designation "2" on preset wheel 16, then contact 49 must be positioned opposite the designation "2" on counting wheel 14.

Electrical contact to the various conductive elements carried by the counting and preset wheels is established by a plurality of springlike contact fingers 55 and 56 fastened to insulating block 57 which is supported between side supports 22 of frame 11. Each finger 55 is positioned to engage the outer periphery of the aligned disc 50. Each spring finger 56 is positioned to engage the outer periphery of the aligned disc 42. Thus, as will be hereinafter fully explained, an electrical circuit is made through each contact finger 55, disc 50, contact 49, disc 44, disc 42, and contact 56, except at the relative rotated position of preset wheel 16 and counting wheel 14 wherein contact 49 engages the nonconductive abutment 47.

Outside setting of the preset wheels is provided by a plurality of setting wheels 17 which are similar in configuration to a gear having every other tooth removed and which are mounted for independent rotation on the shaft 61 supported between side supports 22. The spacing of the ten teeth 62 are such as to coincide with the spacing of the grooves 40 in preset wheel 16 so that teeth 62 mesh with projections 41 to cause rotation of preset wheel 16 with setting wheel 17 in either clockwise or counterclockwise direction. In order to provide positive positioning of the setting and preset wheels, a spring biased detent 65 is provided to engage the flats between adjacent teeth 62 on setting wheel 17.

Figure 15:
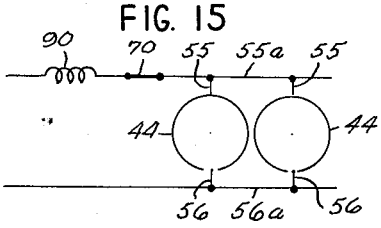
FIG. 15 is a schematic circuit diagram of a circuit usable with the counter of FIG. 1.

From the foregoing description, it is apparent that each preset wheel can be independently rotated to position the associated nonconductive abutment and to provide a desired preset indication in the windows of the housing 12. Assuming each of the counting wheels is at "0" and that the numerals 1959 have been set on the preset wheels, it is apparent from the foregoing description that a complete circuit will exist between each pair of contact fingers 55 and 56. Contact fingers 55 are connected together by wire 55a and contact fingers 56 are connected together by wire 56a so as to set up a parallel circuit having four branches, each of which is opened only when the concerned contact 49 engages the associated insulating abutment 47. Thus, if the counting solenoid is energized to advance each of the counting wheels until the numerals 1959 appear in the windows 13, the counting wheels will have the same relative rotated position as the preset wheels and each contact 49 will be in engagement with the associated abutment 47 thereby to open each branch of the parallel circuit simultaneously. Referring to FIG. 15, it is seen that a typical control circuit in series with various parallel branches through the conductive elements carried by the counting and preset wheels will be deenergized by attaining the predetermined count. That is, a conventional magnetic contactor having its holding coil 90 connected in series with the parallel branches including each counting wheel disc 50 and associated preset wheel disc 44 will be deenergized when the preset count is attained and the insulating abutment 47 is engaged by contact arm 48 thereby deenergizing apparatus which is controlled by the contactor.

In order to reset the counting wheels without immediately closing one of the parallel branch circuits so as to re-energize the aforementioned holding coil or other circuit in series with the branch circuits of the counter, the switch 70 (see FIGS. 6 and 15) is provided. Switch 70 has a pair of normally closed contacts 71 and 72 which are connected in series with the parallel branch circuits established through the counter. For convenience in establishing the desired series connection, switch arm 73, which carries contact 71, and finger 56, which engages disc 40 of the highest order preset wheel, are formed integrally as shown in FIG. 10. Cam 75 is pinned to the shaft 21 and is provided with a first cam surface having a notch 76 which cooperates with follower 77 to control operation of the switch 70. In addition, a second cam surface having a notch 78 is provided, which notch is positioned to positively determine the "0" position of each of the counting wheels after reset and is engaged by a spring pressed detent 79. In the illustrated embodiment, the reset is accomplished in a conventional manner by providing a longitudinal slot 80 in shaft 21 which is engaged by a spring-pressed detent 82 carried by each counting wheel. The detents 82 are arranged to drivingly engage the slot 80 only when the shaft 21 is turned in a count advancing direction. Thus, when it is desired to reset the counting wheels after the predetermined count has been reached, rotation of shaft 21 in the advancing direction by moving reset lever 18 not only picks up each counting wheel to effect reset thereof when the detent 82 engages the slot 80, but also rotates cam 75 to move follower 77 outwardly and break the circuit between contacts 71 and 72. The contacts remain separated until a full revolution is completed, at which time all the counting wheels are aligned in the "0" indicating position and detent 79 engages groove 78. Thus, the contactor holding coil 90 is opened upon initiation of resetting movement of shaft 21 and remains deenergized until resetting is completed.

Turning now to the embodiment of my invention shown in FIGS. 11–14, it is seen that a predetermining counter is provided wherein the preset and counting wheels, having appropriate indicia thereon, are mounted on separate parallel shafts so as to reduce the axial length of the counter as well as to provide separate viewing of the preset and counting wheels. In a manner similar to that disclosed for the first described embodiment, a frame designated generally as 110 has a pair of side support members 111 and a front plate 112. The number wheels 114 are rotatably mounted on the shaft 115 which in turn is supported between side members 111 and can be viewed through window 174. Each counting wheel is provided with a driven gear, a two-toothed driving gear and a transfer mechanism between adjacent counting wheels in a conventional manner similar to that disclosed in the embodiment of FIGS. 1–10.

The count displayed on the counting wheels is advanced by a type of ratchet drive mechanism. As most clearly seen in FIG. 12, lever 117 is mounted for oscillation about a pivot point (not shown) under the influence of an electromagnetic solenoid (not shown). When lever 117 is moved to the left, the pawl 120, carried on arm 121, engages ratchet wheel 122 to advance the ratchet wheel and the associated number wheel one-half of a count. As lever 117 returns to the right under the influence of a suitable spring (not shown), pawl 123, pivotally mounted on arm 124, advances the ratchet wheel and counting wheel the remaining one-half of a count. Thus, as arm 117 is oscillated by the electromagnet in response to a suitable input, the units wheel is advanced in half count steps and as the count increases, the higher order wheels are rotated in a conventional manner by a transfer mechanism including transfer pinion 125 (dotted lines, FIG. 12).

A plurality of preset wheels 129, one for each counting wheel, are rotatably mounted on an electrically conductive shaft 130 which is supported in nylon bushings 131 on side members 111. In a manner similar to that previously described, each preset wheel 129 is provided with a toothed periphery which co-operates with the toothed periphery of setting wheels 133 journalled on shaft 134. Shaft 134 is also mounted between side supports 111 and is arranged parallel to the counting wheel and preset wheel shafts. In addition, setting wheels 133 are positively positioned by biased detents 135 in a manner similar to that previously described. Thus, rotation of the setting wheel 133 rotates the associated preset wheel to bring a particular number into view through the window 136 in front plate 112.

Each preset wheel group generally comprises a nylon (or similar nonconducting material) preset wheel 129, a brass circuit plate 140, an insulating disc 141 and a rotatable contact plate 142. As seen in FIGS. 13 and 14, the circuit plate 140 is fastened to preset wheel 129 by the axially extending pins 144. Circuit plate 140 is provided with a peripheral notch 145 into which nonconducting abutment 146 of preset wheel 129 is placed when the plate and preset wheel are assembled. The central aperture 147 in circuit plate 140 embraces the shoulder 148 on preset wheel 129 so as to be fully insulated from the shaft 130. Rotatable contact plate 142 is made of any suitable conducting material and is rotatably supported on shaft 130 (a portion of which is shown in FIGS. 13 and 14) by nylon bushing 150. Projection pin 151 on plate 142 supports generally C-shaped wiping contact 152 so that end 153 is in conducting engagement with shaft 130 and rounded portion 154 engages the inner rim 155 of circuit plate 140. Of course, the electrical contact between rim 155 and shaft 130, as established by contact 152, is broken when rounded portion 154 contacts the nonconducting abutment 146.

Contact plate 142 is rotated in unison with its associated counting wheel through the engagement of the idler gear 160 with the toothed periphery 161 of contact plate 142 and gear 162 carried by each counting wheel. The idler gears 160 associated with each plate 142 and counting wheel 114, are rotatably supported on shaft 159.

Bridging contact 165 is supported on frame 110 and is provided with a plurality of inwardly extending contact fingers 166 which are positioned to ride on the outer rim 167 of circuit plate 140. It is noted that, because the point of contact of finger 166 with rim 167 is diametrically opposite the viewing window 136 (see FIG. 12), nonconducting abutment 146 is arranged to be diametrically opposite the "0" indication on the preset wheel. Contact 168 is supported by frame 110 and establishes electrical contact with conductive shaft 130.

It is therefore seen that parallel branch circuits are established between shaft contact 168 and shaft 130 and bridging contact 165 through each contact 152 and circuit plate 140 except when the preset wheel is in the "0" position (as shown in FIG. 12) or when contact 152 engages insulating abutment 146 at which position the associated counting wheel has the same rotated position as its preset wheel. To state this concept in a different way, it is noted that setting preset wheels 129 for the numbers 1959 when counting wheels 114 indicate zero, establishes parallel branch circuits through each finger 166 to shaft 130 until the counting wheels indicate the numeral 1959, at which time each of the contacts 152 will have been rotated to a position wherein they engage the associated insulating abutment 146 to open each of the parallel circuit branches simultaneously. A control circuit such as that shown in FIG. 16 and including holding coil 190 of a magnetic contactor connected in series with the parallel branch circuits of the counter, will be deenergized when the counting wheels attain the predetermined count set on the preset wheels.

For illustrative purposes, the embodiment of FIGS. 11 and 12 is shown to include what is known as a heart cam reset. A heart cam 170 (see dotted lines in FIG. 12) is positioned on each counting wheel so that the low point 172, when engaged by the follower 173, causes the wheel to assume the position wherein the "0" designation appears in the window 174. As is known in the prior art, pushing against button 176 to move rod 177 inwardly, causes the transfer pinions to move out of engagement with the counting wheels and brings the follower 173 into engagement with the heart cam 172 to cause rotation of the number wheel to the "0" position. At the same time and in accordance with the teachings of this invention, movement of shaft 177 inwardly to reset the counting wheels causes latch 180 to pivot downwardly out of the path of latch pin 181. Thus, the normally closed contacts 182 and 183 are permitted to open under the downwardly biased spring force of arm 184. It is therefore apparent that initiating reset movement permits contacts 182 and 183 to open and remain open until the resetting movement is completed, at which time rod 177 is released and latch 180 returns to its normal positions and, in so doing, brings the latch pin 181 upwardly to close the contacts 182 and 183. Thus, by connecting contacts 182 and 183 in series with bridging contact 165, it is seen in FIG. 16 that the circuit including holding coil 190, which is controlled by the branch circuits through the preset wheels, is held open until the resetting of the counter is completed.

From the foregoing description of the illustrated embodiment of our invention, it is apparent that we have provided a predetermining counter which permits outside setting of the number wheels in either direction of rotation regardless of whether the counter is operating or not. The structure utilized to accomplish this flexibility of operation is simple, reliable, rugged, and effective. In addition, it is noted that both illustrated embodiments of this invention enable the predetermining counter to control an associated external electrical circuit so that the circuit is opened only when the predetermined count is reached or when resetting motion of the counting wheels is initiated. By providing for opening of the circuit during resetting movement, inadvertent re-energization of the associated electrical device is prevented once it has been disconnected by reaching the predetermined count. It is also noted that other electrical circuit arrangements can be provided even though the illustrated embodiments are concerned with parallel counting wheel circuits.

As will be apparent to persons skilled in the art, various modifications and adaptations of the structure above described will become readily apparent without departure from the spirit and scope of the invention, the scope of which is defined in the appended claims.

We claim:

1. A counter of the predetermining type comprising a totalizing counter having first and second rotatably supported, indicia bearing counting wheels and transfer means connecting said first and second counting wheels, first and second rotatably mounted, indicia bearing preset wheels, each said preset wheel being supported adjacent to its associated counting wheel whereby corresponding indicia are available for simultaneous viewing, a first conductive disc mounted on each of said preset wheels and coaxial therewith, a second conductive disc mounted adjacent to each of said first conductive discs for rotation coaxial therewith, each said second conductive disc having a contact thereon normally in engagement with the adjacent first conductive disc throughout substantially a full revolution of relative rotation between said discs, a driving connection between each said second disc and one of said counting wheels whereby said second disc is rotated in unison with said counting wheel, a nonconductive segment positioned on each said preset wheel in the path of contact between said first and second discs, said nonconductive segment electrically separating the first and second disc in one relative rotated position thereof, a rotatably supported setting wheel engaged with each preset wheel to establish the desired count at which the circuit between each said first and second disc is opened, and means electrically connecting each adjacent first and second conductive discs in parallel relationship with each other adjacent first and second conductive discs thereby to establish parallel branch circuits which are simultaneously opened upon attaining the preset count.

2. A counter of the predetermined type comprising a totalizing counter having first and second indicia bearing counting wheels, a shaft rotatably supporting said counting wheels and transfer means disposed intermediate said first and second counting wheels, first and second indicia bearing preset wheels rotatably mounted on said shaft coaxial with said counting wheels, said counting and preset wheels being alternately arranged on said shaft, first and second conductive discs mounted one on each side of said preset wheel and coaxial therewith, means electrically connecting the discs on each preset wheel, a third conductive disc mounted on each said counting wheel for rotation in unison therewith, said third conductive disc having a contact thereon normally in engagement with said second conductive disc throughout substantially a full revolution of relative rotation therebetween, a nonconductive segment positioned on each said preset wheel in the path of contact between said second and third discs, said nonconductive segment electrically separating said second and third discs in one relative rotated position, independent means for rotatably positioning each preset wheel to establish the desired count at which said nonconductive segment is engaged by said contact on said third conductive disc, and means electrically connecting each adjacent first and second conductive discs in parallel relationship with each other adjacent first and second conductive discs thereby to establish parallel branch circuits which are simultaneously opened upon attaining the preset count.

3. The counter as set forth in claim 2 wherein said shaft is provided with an axial groove, and a spring finger is provided in the hub of each counting wheel so that rotation of said shaft in one direction will cause resetting of said counting wheels, a cam on said shaft having a depression therein, and a pair of normally closed contacts, one of which is provided with a cam follower so that rotation of said shaft in the reset direction causes said switch contacts to open and to remain open until the reset movement is completed thereby to interrupt any circuit connected thereto during resetting of the counter, said switch contacts being connected in series with electrical connecting means.

4. A counter of the predetermining type comprising a totalizing counter having first and second counting wheels, said counting wheels being journalled for rotation on a first shaft and having transfer means disposed intermediate thereof, first and second preset wheels, said preset wheels being journalled for rotation on an electrically conductive second shaft parallel to said first shaft, a first conductive disc mounted on each of said preset wheels and coaxial therewith, said first disc being insulated from said second shaft, a second conductive disc mounted adjacent to each said first conductive disc for rotation about said second shaft, each said second conductive discs having a contact thereon engaging said shaft and said first conductive disc throughout substantially a full revolution of relative rotation between said discs, each said second conductive disc having gear teeth formed in its outer periphery, an idler gear rotatably supported intermediate said counter wheel and said second disc and operative to effect driving engagement therebetween, a nonconductive abutment positioned on each said preset wheel in the path of electrical contact between said first and second discs, said nonconductive segment electrically separating said first and second discs in one relative rotated position thereof, and independent means for independently positioning each said preset wheel to establish the desired count at which the branch circuits through each first and second disc simultaneously open.

5. A predetermining counter comprising a totalizing counter having first and second rotatably mounted, indicia bearing counting wheels and transfer means operatively connecting said counting wheels, a first preset wheel adjacent to and coaxial with the first number wheel, a second preset wheel adjacent to and coaxial with the second number wheel, first and second coaxially mounted rotatable conductors, said first conductor being driven by the adjacent counting wheel and said second conductor being driven by the adjacent preset wheel, said second conductor having a contact portion extending less than 360° about its axis of rotation, a contact on said first conductor engageable with said contact portion of said second conductor, first and second setting wheels, means rotatably mounting said second wheels for rotation about a common axis parallel to the axis of rotation of the counting wheels, and means for establishing external electrical connections to said first and second conductors.

6. A predetermining counter comprising a totalizing counter having first and second rotatably mounted, indicia bearing counting wheels and transfer means operatively connecting said counting wheels, a first preset wheel disposed between and mounted coaxial with said first and second number wheels, a first conductor mounted on said preset wheel, a second conductor mounted on said first counting wheel, said first conductor having a contact portion extending less than 360° about its axis of rotation, a contact on said second conductor engageable with the contact portion of said first conductor, and means for establishing external electrical connections to said first and second conductors.

7. A predetermining counter comprising a totalizing counter having first and second rotatably mounted, indicia bearing counting wheels and transfer means operatively connecting said counting wheels, a first preset wheel adjacent the first number wheel, a second preset wheel adjacent the second number wheel, first and second coaxially mounted rotatable conductors driven by the adjacent counting wheels and preset wheels respectively, one of said conductors having a contact portion extending less than 360° about its axis of rotation, a contact on the other of said conductors engageable with said contact portion of said first conductor, and means for establishing external electrical connections to said first and second conductors.

References Cited in the file of this patent

UNITED STATES PATENTS

| | | |
|---|---|---|
| 2,295,968 | Poole | Sept. 15, 1942 |
| 2,440,665 | Jeffrey | Apr. 27, 1948 |
| 2,479,482 | Edler | Apr. 16, 1949 |
| 2,652,198 | Kennedy | Sept. 15, 1953 |
| 2,781,172 | Leonard | Feb. 12, 1957 |
| 2,781,976 | Hoffman | Feb. 19, 1957 |
| 2,935,256 | Burton | May 3, 1960 |